United States Patent Office 3,210,157
Patented Oct. 5, 1965

3,210,157
METHOD FOR GENERATING HYDROGEN
Charles H. Lewis, Jr., Danvers, and Eugene D. Robie, Ipswich, Mass., assignors to Metal Hydrides Incorporated, Beverly, Mass., a company incorporated of Massachusetts
No Drawing. Filed Jan. 29, 1962, Ser. No. 169,649
2 Claims. (Cl. 23—211)

This invention relates to the generation of hydrogen by the reaction of water with an alkali metal borohydride, an alkaline earth metal borohydride, or water soluble amine boranes. More particularly, the invention relates to controlling the rate of such reaction.

United States Patent No. 2,534,533 proposes the generation of hydrogen by causing an alkali metal borohydride to react with water. The reaction is illustrated by the equation:

$$MBH_4 + 2H_2O \rightarrow MBO_2 + 4H_2$$

where M is an alkali metal. The reaction proceeds rather slowly and the rate decelerates as the reaction progresses due to the inhibiting effect of increasing alkalinity. To overcome the slowness and incompleteness of the hydrogen evolution the patent suggests the addition of certain catalysts, such as salts of cobalt, nickel, copper and iron. These salts react with alkali metal borohydrides in an aqueous medium as illustrated by the equation:

$$4CoCl_2 + 8NaBH_4 + 18H_2O \rightarrow 2Co_2B + 6H_3BO_3 + 8NaCl + 25H_2$$

Consequently, the actual catalyst is in some cases essentially the boride corresponding to the metal of the salt used, and in some cases essentially the free metal. Although sodium borohydride is preferred, it may be replaced by other water soluble hydrides, such as other alkali metal borohydrides, alkaline earth metal borohydrides, and water soluble amine boranes, such as morpholine boranes, lower N-alkylmorpholine boranes, trimethyl amine borane, etc.

More recently, salts of platinum, rhodium and ruthenium have been proposed as being more effective for catalyzing the reaction between a borohydride and water than salts of cobalt. Salts of cobalt are more effective than salts of nickel which in turn are more effective than salts of iron.

Sodium borohydride is a stable, white, crystalline, commercially available compound. It is the cheapest of the borohydrides, which, along with their derivatives (e.g., certain amine boranes), are virtually unique among hydrides in that they are water soluble. In considering a system for a portable hydrogen generator, cost, weight, volume, and heat evolution are important parameters. Sodium borohydride has excellent balance of all these desired properties. Thus, as compared to calcium hydride, which is currently widely used for this application, only 45% as much sodium borohydride is required to generate an equivalent quantity of hydrogen, and only half as much heat is evolved in the process. Advantages in respect to volume of charge required and potential cost also favor sodium borohydride. Yet, in spite of these obvious advantages, prior technology was such that sodium borohydride and other water-soluble hydrides were ill-suited for field generation of hydrogen because the rate of hydrogen evolution could not be controlled.

As pointed out in the copending application of Sidney Johnson and Charles H. Lewis, Serial No. 147,488, filed October 25, 1961, satisfactory generation of hydrogen can be achieved within 30 minutes on a 6 cubic foot scale with an alkali metal borohydride concentration of 24 grams per liter of water with 5 percent by weight of cobaltous chloride based upon the weight of the borohydride. However, when these proportions are used on a 42 cubic foot scale nearly two hours are required to complete the reaction. When the concentration of borohydride is increased, for example to 34 grams of borohydride per liter of water, the time required to complete the reaction is decreased to less than one hour but undesirable foaming results. As described in the above copending application the concentration of alkali metal borohydride can be increased to many times greater than 24 grams per liter of water without encountering troublesome foaming if a small amount of condensed gum turpentine is present in the reaction mixture. As also described in the above copending application the required time for completion of the reaction between the borohydride and water can be greatly reduced without troublesome foaming if, in addition to condensed gum turpentine, a small amount of an accelerator selected from certain amines and hydroxy compounds is present in the reaction mixture.

Since the catalytic hydrolysis of an alkali metal borohydride is quite exothermic, the temperature of the reaction mixture steadily increases as the reaction proceeds thereby causing a steadily accelerating rate of hydrolysis and hydrogen evolution. The present invention contemplates a method for controlling the rate of the catalyzed hydrolysis reaction to obtain a substantially uniform rate of hydrogen evolution, or to regulate the rate in response to demand. In accordance with the invention the catalytic activity of the catalyst is varied to control the rate of hydrogen evolution.

The invention is based in part upon the discovery that an effective catalyst for catalyzing the reaction of an alkali metal borohydride with water can be deposited upon a porous support of alumina or other inert porous material, preferably in the form of a rod, by immersing the support in a solution of an alkali metal borohydride followed by immersion in a solution of a salt of a heavy metal, such as platinum, rhodium, ruthenium, cobalt, nickel, copper or iron. We have discovered further that the catalyst thus formed adheres to the support and is not eluted by hydrogen evolution as a borohydride solution is hydrolyzed.

In accordance with the present invention the catalyst-carrying support, formed as described above, may be immersed in an aqueous borohydride solution and the depth of immersion may be varied to vary the catalytic activity of the catalyst. The catalytic activity can be varied to an even greater extent by depositing catalysts of different catalytic activity on different portions of the porous support so that catalysts of different catalytic activity may be immersed in he borohydride solution to increase or decrease the rate of hydrogen evolution as desired. Thus, one portion of the porous support may be impregnated with a catalyst formed by the reaction of an iron salt and an alkali metal borohydride, a second portion impregnated with a nickel-containing catalyst, and a third portion impregnated with a cobalt-containing catalyst. As a further alternative, each of a plurality of inert porous supports may be impregnated with catalysts of different catalytic activity and the catalyst of desired activity may be immersed in the borohydride solution to increase or decrease the hydrogen evolution as desired. The catalyst-carrying supports may be adjusted manually for the purposes as described above or may be actuated by conventional mechanical means in response to changes in hydrogen pressure, flow rate of evolved hydrogen, or temperature of the reaction mixture as will be understood by those skilled in the art.

The support used for carrying the catalyst in the practice of the invention may be formed of any material which is insoluble in and substantially inert toward the reaction mixture. We have found particularly suitable porous materials which are readily available commercially, such as porous alumina, silica and molecular sieves, the latter consisting essentially of calcium aluminum silicate or magnesium aluminum silicate.

If desired, the support may be formed of the solid catalyst itself. Thus, water may be added to a mixture of an alkali metal borohydride and a heavy metal salt, such as cobaltous chloride, to form a colloidal suspension which is essentially the boride of the heavy metal. This colloidal suspension may be coagulated, removed from the water and dried. The dried product then may be compacted under heavy pressure to the shape of the support desired. The support thus formed may be used as the catalyst in the practice of the invention or catalysts of different catalytic activity may be utilized on different portions of a composite rod, or in a plurality of rods, in the manner as previously described.

We claim:

1. In the method for generating hydrogen which comprises reacting a borohydride with water in the presence of a hydrolysis catalyst, the improvement wherein the catalytic activity of the catalyst is varied to control the rate of hydrogen evolution by varying the area of the surface of the catalyst in solid form in contact with the reaction mixture, said catalyst being deposited in an adherent form on an inert porous support by immersing said support in a solution of a borohydride followed by immersion in a solution of a salt of a heavy metal, the area of the surface of the catalyst in contact with the reaction mixture being varied by varying the depth of immersion of the catalyst-carrying support in the reaction mixture, said borohydride being hydrolyzed and said borohydride used in forming the catalyst being selected from the group consisting of water soluble alkali metal borohydrides, water soluble alkaline earth metal borohydrides, and water soluble amine boranes.

2. The method as claimed by claim 1 wherein the rate of hydrogen evolution is varied by immersing in the hydrolyzation reaction mixture different portions of the catalyst carrying support, said different portions carrying a catalyst of different catalytic activity for the hydrolyzation reaction, the catalyst on each of said different portions of said support being deposited thereon by immersing each portion in a solution of the selected borohydride followed by immersion in a solution of a salt of a heavy metal.

References Cited by the Examiner
UNITED STATES PATENTS

| 1,255,590 | 2/18 | Ellis | 252—432 X |
| 1,840,450 | 1/32 | Jaeger et al. | 252—432 X |
| 2,193,814 | 3/40 | Heard | 252—432 |
| 2,393,240 | 1/46 | Dreyfus | 23—1 |
| 2,461,661 | 2/49 | Schlesinger | 23—14 |
| 2,534,533 | 12/50 | Schlesinger et al. | 23—211 X |

FOREIGN PATENTS

| 103,051 | 2/38 | Australia. |

OTHER REFERENCES

Ser. No. 357,989, Brendlein (A.P.C.), published May 25, 1943.

MAURICE A. BRINDISI, *Primary Examiner.*